United States Patent [19]
Tamegai

[11] Patent Number: 6,014,350
[45] Date of Patent: Jan. 11, 2000

[54] INFORMATION REPRODUCING OR RECORDING APPARATUS PROVIDED WITH MEMORY FOR STORING DATA, AND INFORMATION REPRODUCING OR RECORDING METHOD USING THE SAME APPARATUS

[75] Inventor: Masahiro Tamegai, Kawasaki, Japan

[73] Assignee: Canon Kabushiki Kaisha, Tokyo, Japan

[21] Appl. No.: 09/172,871

[22] Filed: Oct. 15, 1998

Related U.S. Application Data

[62] Division of application No. 08/609,742, Mar. 1, 1996.

[30] Foreign Application Priority Data

| Mar. 3, 1995 | [JP] | Japan | 7-044098 |
| Jun. 12, 1995 | [JP] | Japan | 7-144314 |

[51] Int. Cl.[7] .................................................. G11B 17/22
[52] U.S. Cl. ............................................. 369/32; 369/54
[58] Field of Search ..................... 369/32, 44.28, 369/54, 44.27, 44.29, 44.26, 44.31, 44.32, 44.33

[56] References Cited

U.S. PATENT DOCUMENTS

| 4,896,025 | 1/1990 | Hasegawa | 235/437 |
| 4,931,628 | 6/1990 | Wada | 235/454 |
| 4,982,391 | 1/1991 | Sakagami et al. | 369/32 |
| 4,982,394 | 1/1991 | Kanda et al. | 369/44.32 |
| 5,018,124 | 5/1991 | Ogasawara et al. | 369/44.33 |
| 5,274,615 | 12/1993 | Rokutan | 369/32 |
| 5,442,613 | 8/1995 | Horiguchi | 369/54 |

Primary Examiner—Tan Dinh
Attorney, Agent, or Firm—Fitzpatrick, Cella, Harper & Scinto

[57] ABSTRACT

When information is reproduced from a recording medium having a plurality of tracks with respective addresses, a head is moved relative to the recording medium in order to let the head make access to a target track. A memory is provided for storing information having been reproduced in the past by the head. When, in making the access, the head reaches another track as failing to make access to the target track, a controlling unit reads information of the other track reached and stores the information in the memory. In recording of information, when, in making the access, the head reaches another track as failing to make access to the target track, the controlling unit writes information in the other track reached.

4 Claims, 10 Drawing Sheets

Cnt: PHYSICAL DEFECT COUNTER
Ptr: PHYSICAL DEFECT LIST NUMBER
La: GIVEN LOGICAL ADDRESS
Bad_A(Ptr): PHYSICAL DEFECT START ADDRESS
Bad_N(Ptr): NUMBER OF CONSECUTIVE PHYSICAL DEFECTS
Pa: PHYSICAL ADDRESS TO BE OBTAINED

| DEFECT LIST NUMBER | 1 | 2 | 3 | 4 | 5 |
|---|---|---|---|---|---|
| DEFECT START ADDRESS | 6 | 0 | 0 | 0 | 0 |
| NUMBER OF CONSECUTIVE DEFECTS | 5 | 0 | 0 | 0 | 0 |

INFORMATION REPRODUCING OR RECORDING APPARATUS PROVIDED WITH MEMORY FOR STORING DATA, AND INFORMATION REPRODUCING OR RECORDING METHOD USING THE SAME APPARATUS

This application is a divisional of copending application Ser. No. 08/609,742, filed Mar. 1, 1996.

BACKGROUND OF THE INVENTION

1. Field of the Invention

The present invention relates to an information reproducing method for reading information out from an information recording medium such as an optical card or an optical disk and an information recording method for writing information in the recording medium, and more particularly, to an information reproducing or recording method for an information reproducing or recording apparatus applied when track jump is unsuccessful in a seek operation on the information recording medium.

2. Related Background Art

The information recording-media conventionally known include optical disks and optical cards for optically recording and reproducing information, fixed magnetic disks and floppy disks for magnetically recording and reproducing information, and magneto-optical disks, optical cards, etc. for optically and magnetically recording and reproducing information.

Generally, these information recording media have tracks consisting of a plurality of sectors. The tracks are provided with address information (hereinafter referred to as track numbers) indicating their positions in the information recording medium when the information recording medium is produced or formatted. Then, a desired track position is sought for, based on the track number, and recording or reproduction is carried out at that position. The information reproducing apparatus for reproducing the information in the recording medium is equipped with a memory for storing data of one or more tracks, and the cache technique is used upon reproduction of a desired sector in order to store data of all sectors including the desired sector in the track and decrease the number of track scans.

An example of operation of the conventional reproducing apparatus is next explained referring to the flowchart of FIG. 1. First, a host computer sends a logical address of an information reproducing portion together with a reproducing instruction to the reproducing apparatus. The reproducing apparatus having a memory for storing a part of data previously searched checks whether there is data of the logical address in the memory (step S11). If there is data, the reproducing apparatus transmits the data of the address in the memory to the host computer (step S15). If the data is absent, the apparatus obtains a physical address from the logical address, calculates a target track number corresponding to the physical address, and tries moving to the target track (step S12). Here, the apparatus scans the track to identify the track number, and checks whether the movement to the target track was unsuccessful (step S13). If unsuccessful, the apparatus again tries moving to the target track (step S12). If the movement to the target track was successful, data of the track is stored in the memory (step S14), and data of the desired sector is transferred to the host computer (step S15).

There is a limit to the capacity of the memory mounted in the reproducing apparatus. Thus, as to a method for abandoning stored data, a variety of proposals have been given; for example, first-in first-out abandonment, abandonment taking into account frequency of data reproduction address instruction, first-in last-out abandonment, etc.

An example of operation of a conventional recording apparatus is next explained referring to the flowchart of FIG. 2. First, receiving a recording instruction of data from the host computer (not shown), the recording apparatus (hereinafter referred to as a drive) moves a recording head to a target track corresponding thereto to look for a non-recorded area of an information recording unit (except for those registered as defective areas) (step S11). Since the track number cannot be identified without scanning the track, the recording head first scans the track to determine whether movement to the target track was successful (step S12). If the track is not the target track, the apparatus again looks for the target track (step S11). If it is the target track, recording and verification of data are carried out by scanning (steps S13, S14). Then, it is checked whether verification was successfully done (step S15). If there is an anomaly in verification, the apparatus performs altering processing, for example, preparation of movement to a next track (step S16). If the operation is normally ended, the recording processing is completed.

The above conventional example, however, had such a defect that the track scanning time for fault movement was wasted, because whether the movement to the desired track, instructed by the host computer, was unsuccessful was not able to be determined without scanning the track to which the head had moved.

SUMMARY OF THE INVENTION

The invention has been made so as to solve the above mentioned problem. That is, the object of the invention is to provide an information recording/reproducing apparatus in which even if an optical head fails to access a desired track, a time spent for scanning of a track thereupon is never wasted.

Specifically, the above object can be achieved by the following constitutions.

The object can be achieved by an information reproducing apparatus for reproducing information from a recording medium having a plurality of tracks with respective addresses, comprising:
 a reproducing head;
 a moving mechanism for relatively moving the reproducing head relative to the recording medium in order to let the reproducing head make access to a target track;
 a memory for storing information having been reproduced in the past by the reproducing head; and
 controlling means arranged in such a manner that when, in making the access, the reproducing head reaches another track as failing to make access to the target track, the controlling means reads information of the other track reached and stores the information in the memory.

The above object can also be achieved by an information reproducing method for reproducing information, using a reproducing head, from a recording medium having a plurality of tracks with respective addresses and storing information having been reproduced in the past in a memory, comprising:
 a step of letting the reproducing head make access to a target track; and
 a step of, when in making the access the reproducing head reaches another track as failing to make access to the target track, reading information of the other track reached and storing the information in the memory.

Further, the above object can also be achieved by an information recording apparatus for recording information in a recording medium having a plurality of tracks with respective addresses, comprising:

a recording head;

a moving mechanism for relatively moving the recording head relative to the recording medium in order to let the recording head make access to a target track; and controlling means arranged in such a manner that when in making the access the recording head reaches another track as failing to make access to the target track, the controlling means writes information in the other track reached.

Further, the above object can also be achieved by an information recording method for recording information, using a recording head, in a recording medium having a plurality of tracks with respective addresses, comprising:

a step of letting the recording head make access to a target track; and a step of, when in making the access the recording head reaches another track as failing to make access to the target track, writing information in the other track reached.

DETAILED DESCRIPTION OF THE PREFERRED EMBODIMENTS

First Embodiment

Figure 1:
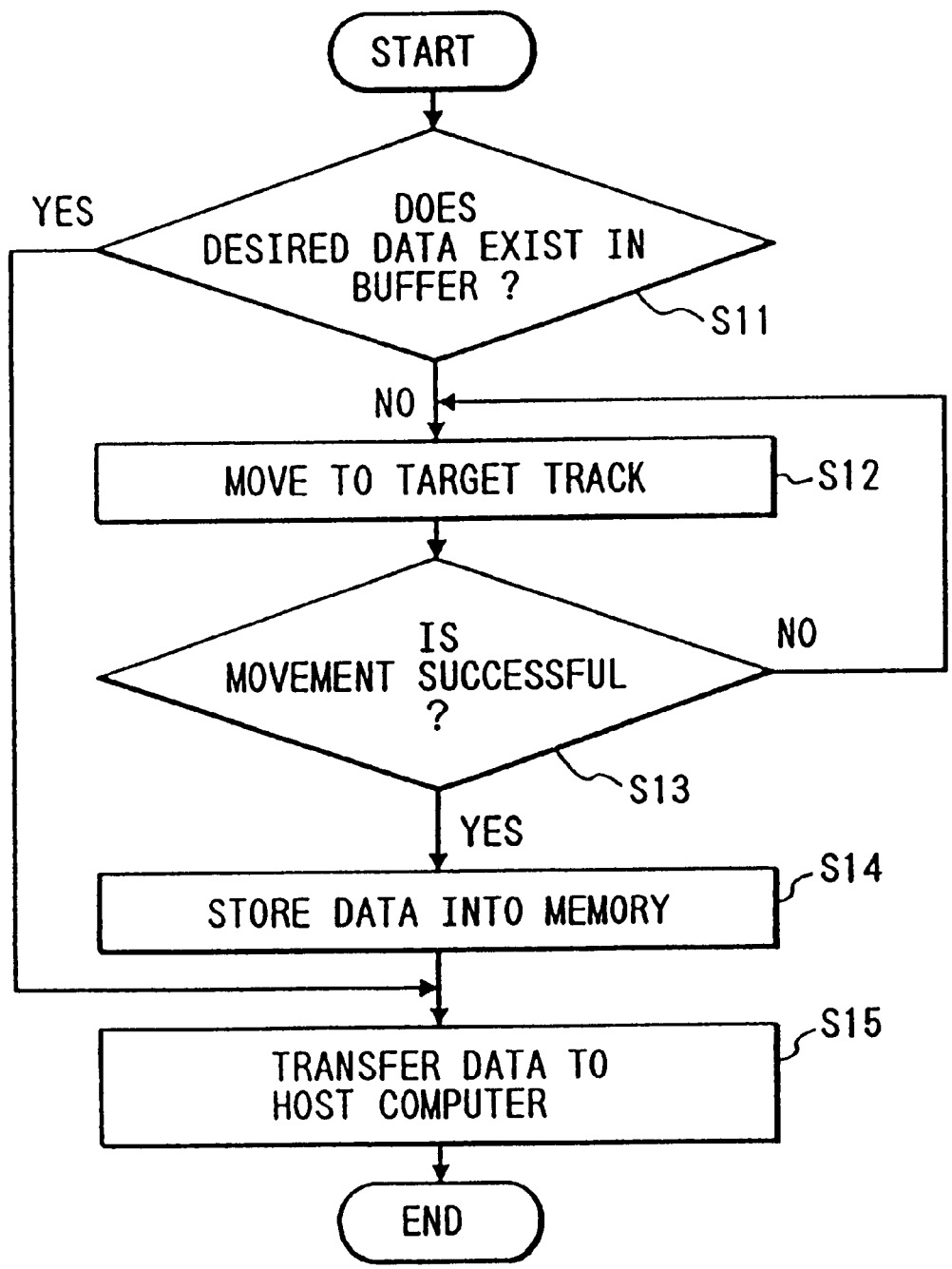
FIG. 1 is a flowchart to show a flow of processing in the conventional information reproducing method.
Figure 2:
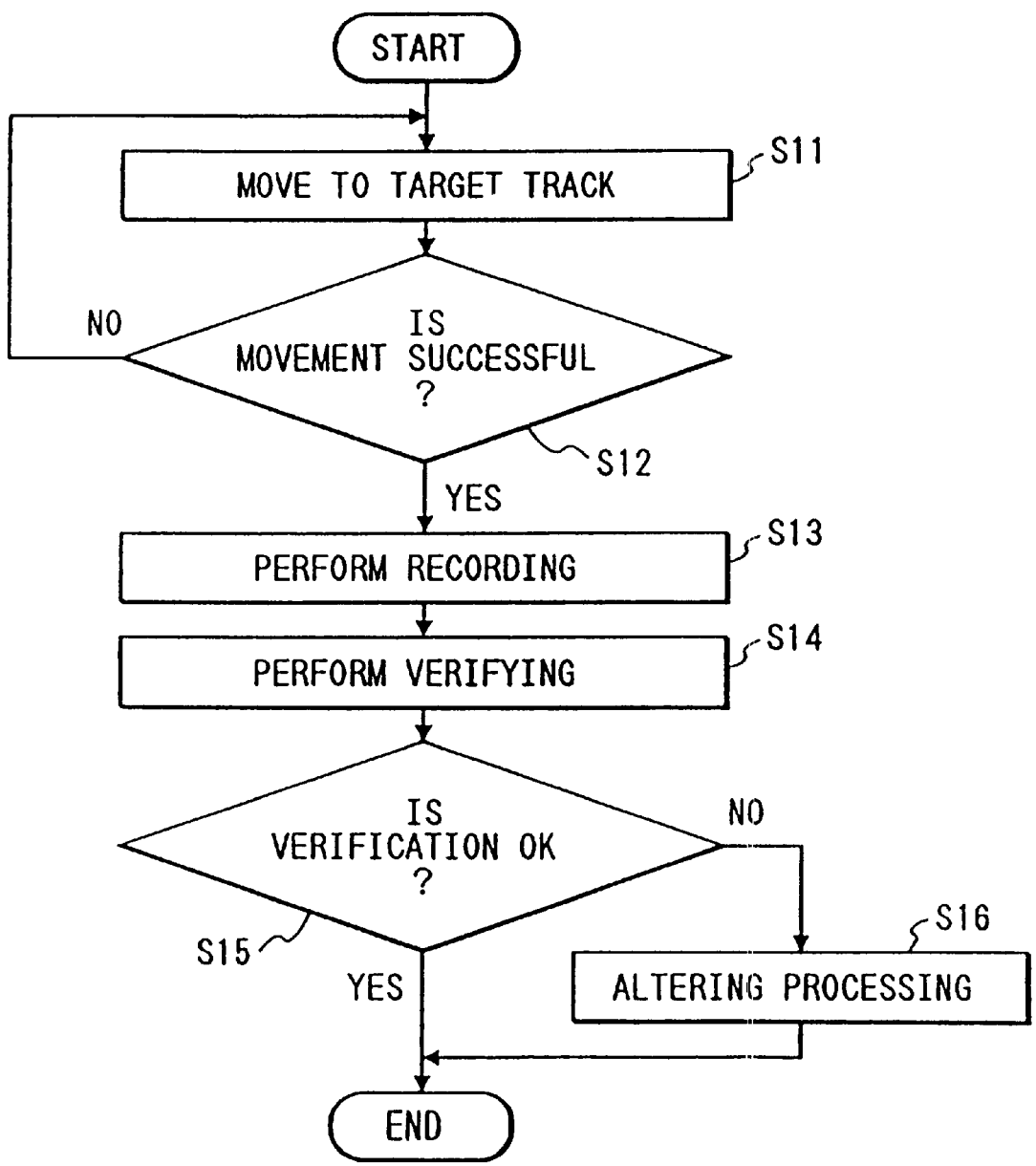
FIG. 2 is a flowchart to show a flow of processing in the conventional information recording method.
Figure 3:
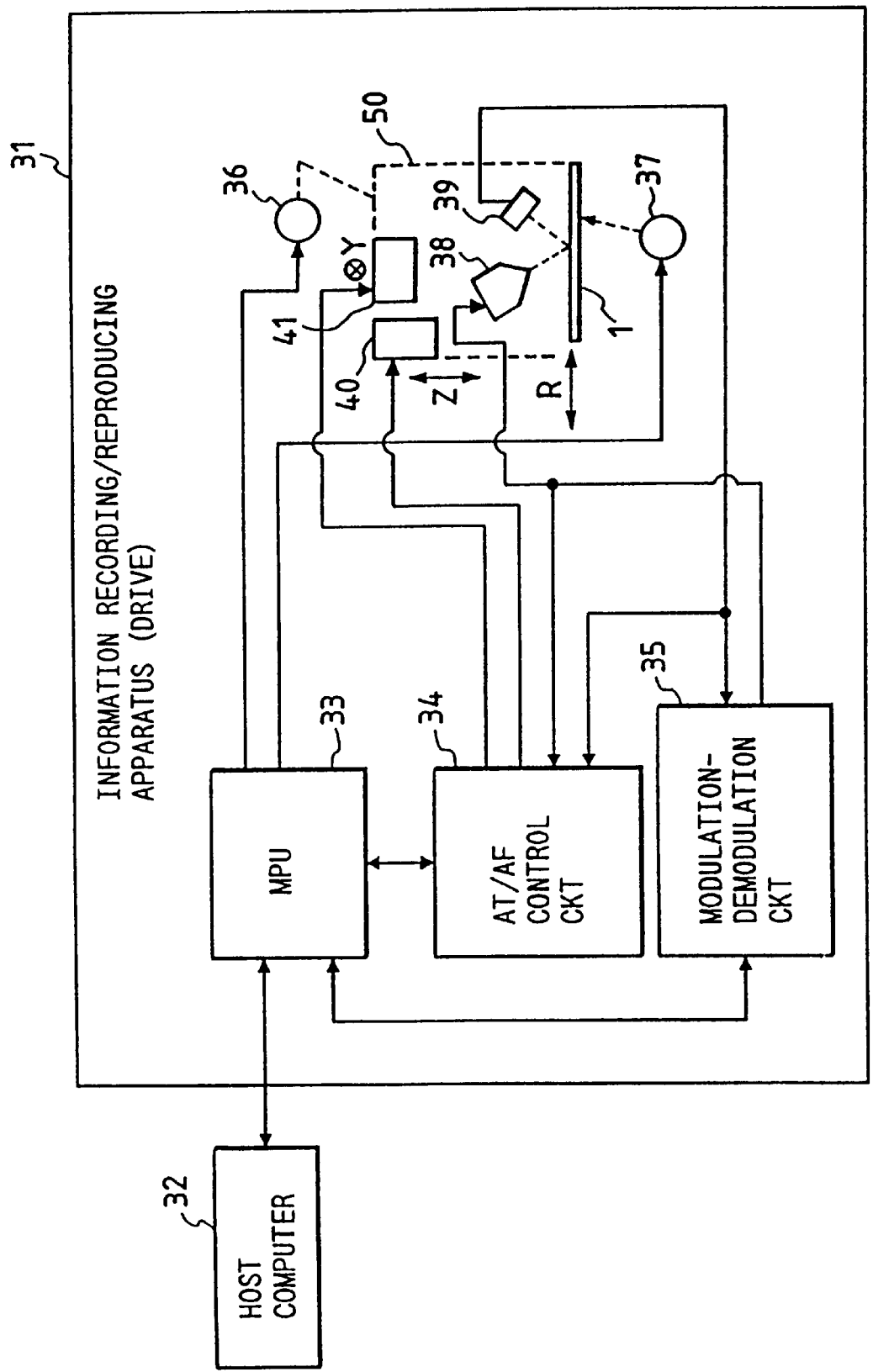
FIG. 3 is a drawing to show an example of a setup of the information recording/reproducing apparatus used in the information reproducing or recording method of the present invention.

The embodiments of the present invention will be explained in detail with reference to the drawings. FIG. 3 is a block diagram to show an example of the setup of the information recording/reproducing apparatus used in the information reproducing method of the present invention. In FIG. 3, reference numeral 1 designates an optical card, 31 the recording/reproducing apparatus (hereinafter referred to as a drive), and a host computer 32 of a host control unit is connected to the drive 31. Numeral 37 denotes a motor for driving the optical card, which introduces the optical card 1 through an unrepresented carrying mechanism into the drive 31, translationally moves the optical card 1 in directions R by a predetermined drive, and further discharges the optical card out of the apparatus (through a discharging mechanism not shown). Numeral 38 represents an optical beam irradiation optical system including a light source, which forms an optical beam spot on the optical card 1 upon recording of information and upon reproduction of information. Numeral 39 stands for a photodetector, which can receive reflected light of the optical beam spot on the above optical card 1. Numeral 40 denotes an AF actuator for performing autofocusing servo (AF) by driving a part of the optical beam irradiation optical system 38 to move the focus position of the optical beam spot on the surface of optical card 1 in the Z-direction, that is, in a direction perpendicular to the surface of optical card 1, and numeral 41 an AT actuator for performing autotracking servo (AT) by driving a part of the optical beam irradiation optical system 38 to move the optical beam spot on the surface of optical card 1 in the Y-direction (that is, in a direction perpendicular to both the R-direction and the Z-direction).

The optical head 50 is formed as including the above optical beam irradiation optical system 38, photodetector 39, AF actuator 40, and AT actuator 41. Further, numeral 36 designates a drive motor for moving the optical head 50 in the Y-direction to effect access of the optical beam spot to a desired track on the optical card 1. The arrangement for access of the optical beam spot may be replaced by an arrangement for moving the optical card 1 in the Y-direction.

MPU 33 is a microcomputer, including memories of ROM and RAM, which controls the card feed motor 37 and the head feed motor 36 and which performs communication, control, etc. of data with the host computer 32 under control thereof. Receiving a signal from the photodetector 39, an AT/AF control circuit 34 drives the AF actuator 40 and AT actuator 41. The output signal from the above photodetector 39 is input into the AT/AF control circuit 34 and, based on this output signal, the AT/AF control circuit 34 executes AF and AT as controlling the above AF actuator 40 and AT actuator 41. The output from the above photodetector 39 is also output to a modulation-demodulation circuit 35, where demodulation of read information is carried out. A demodulated signal is sent to the above MPU 33, which forms desired data therefrom and outputs the data to the host computer 32.

The modulation-demodulation circuit 35 modulates an information signal sent from the above MPU 33, drives the above optical beam irradiation optical system 38 in accordance with the modulation signal to execute information recording, and demodulates data, based on the signal from the photodetector 39, upon reproduction. The host computer 32 performs transmission of data to and from the drive 31, and executes a recording/reproducing operation of information for every data track. Generally, the optical card 1 has a high error rate because of the properties of the recording medium, and requires an error correcting means in applications necessitating information with high reliability.

Figure 4:
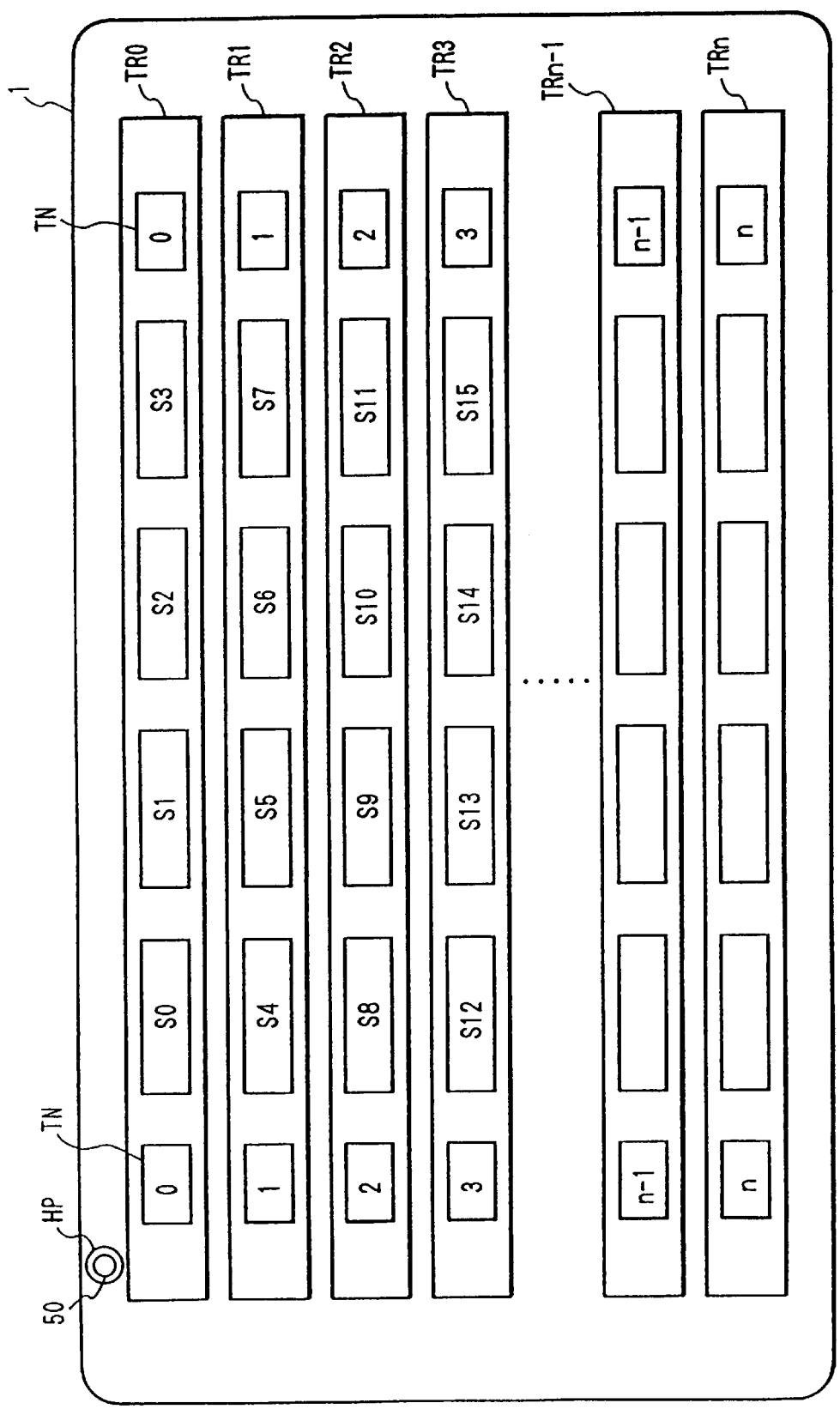
FIG. 4 is a schematic drawing of a recording surface of an optical card in which data is recorded, which is used-in explaining the information reproducing method of the present invention.

FIG. 4 is a drawing to show a recording surface of the optical card used in the information reproducing method of the present embodiment, in which reference numeral 1 denotes the optical card, 50 the optical head located at the home position, S0 to S15 sectors, TN track numbers recorded with the same numbers at the left and right edges of the optical card 1, TR0 to TRn tracks, and HP the home position of the optical head. When the optical card 1 is inserted into the drive 31, the optical head 50 is first located at the home position HP after the optical card 1 is loaded. The following description is given assuming the reproducing apparatus is equipped with a sufficient memory in the present embodiment.

Figure 5:
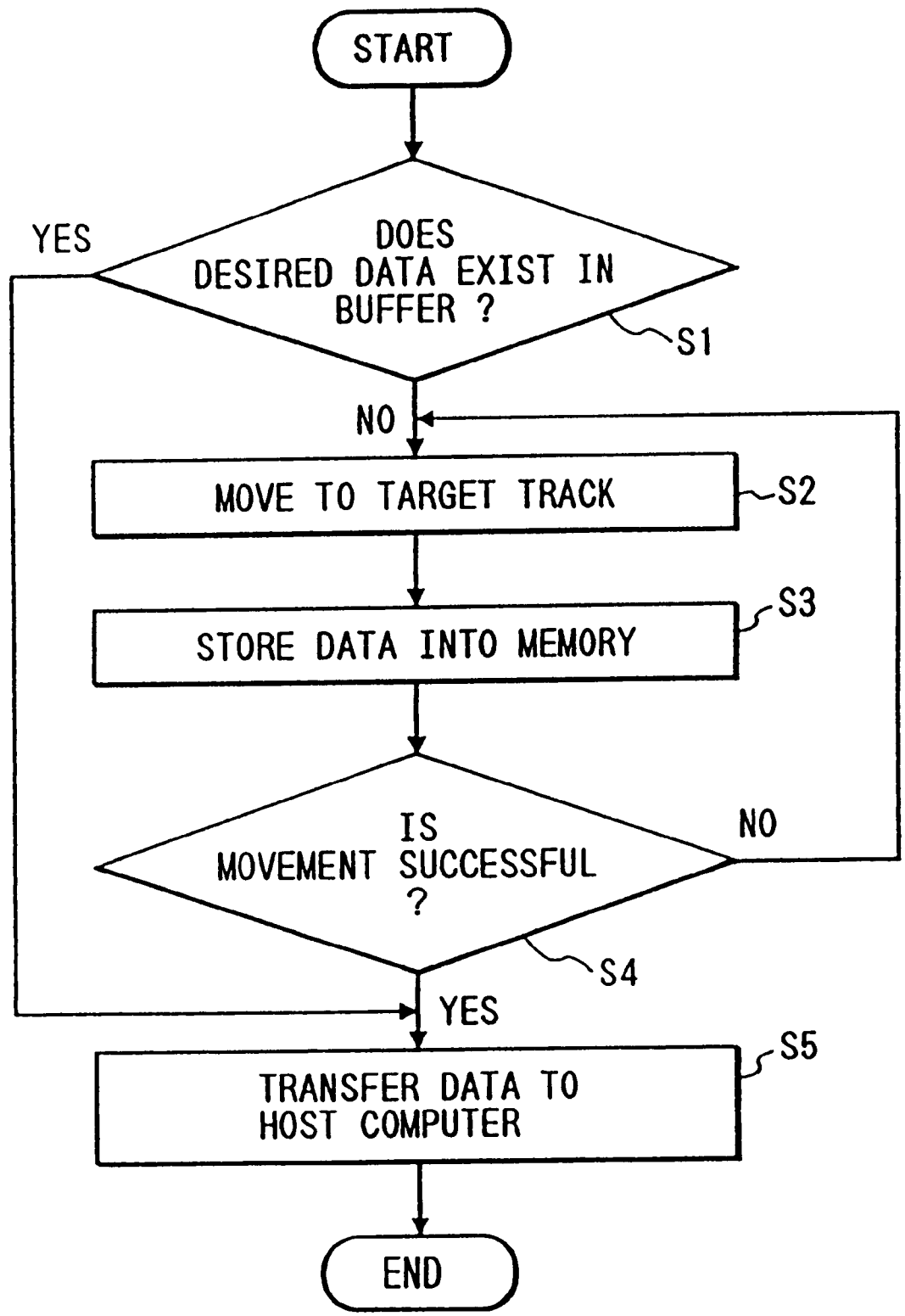
FIG. 5 is a flowchart to show a flow of processing of the information reproducing method of the present invention.

FIG. 5 is a flowchart to show processing procedures of a first algorithm of the present invention, and the next description is given according thereto. Let us suppose the host computer 32 issued a reproducing instruction, for example, of sector S10 shown in FIG. 4 to the drive 31. At this time, the MPU 33 checks whether the data of sector S10 is present or not in the memory (step S1). If the data is present in the memory, the flow goes to step S5 to transfer the data in the memory in the MPU 33 to the host computer 32 and finish the processing; but, assuming the data is absent in the memory in the present embodiment, the flow goes to step S2. Since the sector S10 exists in track TR2 in the optical card 1, the MPU 33 uses the drive motor 36 to move the optical head 50 to the track TR2 (step S2). However, whether a track to which the optical head 50 was moved is actually the track TR2 cannot be determined unless the optical head scans the track to detect the track number TN.

Suppose the movement was unsuccessful in the present embodiment, so that the optical head 50 is located at the track TR3. Then, the MPU 33 drives the card feed motor 37 to perform track scanning with the optical head 50. Then, data S12 to S15 is stored in the memory (step S3). If the movement to the target track was successful, the data of sector S10 is transferred to the host computer 32 via step S4 (at step S5) to end the processing, but the MPU goes via step S4 to step S2 because the movement to the target track was unsuccessful in the present embodiment. At step S2, the drive tries moving to the target track TR2 on the opposite side in the longitudinal direction of the track to the home position HP, and again performs scanning. The track number TN is read by this scanning and data of four sectors is stored in the memory irrespective of whether the track number TN is 2 (step S3). After it was determined here that the movement to the target track was successful by reading the sector S10 (step S4), the MPU transfers the data of sector S10 to the host computer 32 (step S5), and completes the reproducing processing.

Next, suppose the host computer 32 issues a reproducing instruction of sector S11 to the drive 31. The MPU 33 checks whether the memory has data of sector S11.(step S1), and, because the data of S11 is present in the memory among the sectors S8 to S11 in the above scanning of track TR2, the drive transfers the data of sector S11 to the host computer 32 (step S5).

Next, suppose the host computer 32 issues a reproducing instruction of sector S12 to the drive 31. The MPU 33 checks whether the data of sector S12 is present in the buffer memory (step S1). Since the data of sector S12 was already read into the buffer memory when the track TR3 was scanned on the occasion of fault movement as described previously, the data of sector S12 in the buffer memory is transferred to the host computer without scanning (step S5).

As described above, the memory in the MPU 33 is assumed to memorize data of sectors scanned together with sector numbers irrespective of whether scanning was unsuccessful, and to have a memory capacity sufficient to memorize it. In such a case, the memory is assumed to store all data in the track scanned. In the above algorithm, if the information recording/reproducing apparatus has a sufficient capacity of memory, the memory stores all sector information of the track scanned, thus fully demonstrating the function of so-called cache memory accordingly.

Second Embodiment

Figure 6:
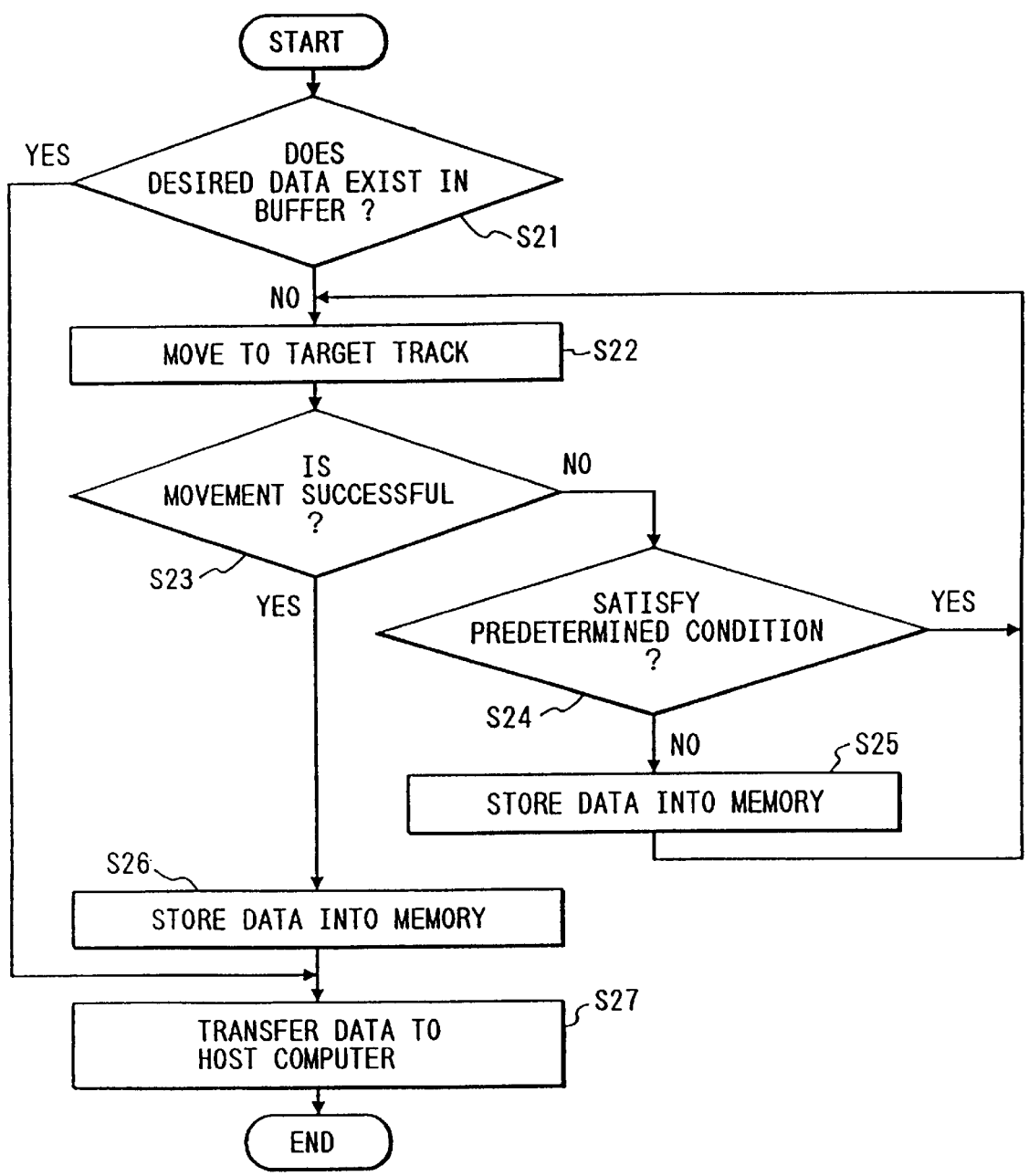
FIG. 6 is a flowchart to show a flow of processing of a second embodiment of the information reproducing method of the present invention.

The first embodiment was arranged in such a manner that the apparatus was equipped with a sufficient memory and the data was always stored in the memory even if the movement to the target track was unsuccessful. However, some reproducing apparatus may not have a sufficient memory capacity because of issues of cost or packaging space. In the case where there is a limit to the capacity of the memory, it can be conceivably determined based on a predetermined algorithm whether scanned data should be stored or not in the case of failure in movement to the target track. The operation according to this predetermined algorithm can save the memory transfer time for storing data in the memory and can simplify the algorithm for abandoning the data stored in the memory. FIG. 6 shows the flowchart to illustrate procedures of processing in the present embodiment. The procedures will be explained in the following.

The host computer 32 gives a reproducing instruction of a sector to the drive 31. At this time the MPU 33 checks whether the data of the sector requested is present in the memory (step S21). If the data is present in the memory, the MPU goes to step S27 to transfer the data in the memory of MPU 33 to the host computer 32 and to end the processing. On the other hand, supposing the data is absent in the memory in the present embodiment, the MPU goes to step S22.

Then, the MPU 33 uses the drive motor 36 to move the optical head 50 to a track where the sector is present (step S22). However, whether the track to which the optical head 50 was moved is actually the desired track or not cannot be determined unless the optical head scans the track to detect the track number TN and further to scan all sectors S in the track number TN to detect a target sector number. If the movement was unsuccessful, the MPU goes to step S24. Here, the MPU determines, based on a predetermined condition, whether the data of the track to which the head moved by the unsuccessful movement to the target track should be stored in the memory or not. Of course, if the movement to the target track was successful at step S23, the data obtained by track scanning is stored in the memory (step S26), and the MPU transfers the data to the host computer (step S27).

In the present embodiment, the predetermined algorithm is explained with three examples. It is assumed in the following description that a read instruction from the host computer 32 is issued in a sector unit.

A first algorithm is such that if the movement to the target track was unsuccessful and if data scanned is not present in the memory then the data is stored in the memory.

Next, a second algorithm is explained referring to FIG. 4 and FIG. 5 used in the first embodiment. Since the elements in the drawings were already described, the description thereof is omitted herein. The second algorithm is such that, presuming that the host computer 32 makes access to sector addresses in order from the smallest, data is stored in the memory only if the head unsuccessfully moved to a track with a larger address than the address of the target track.

Generally, when computers read an external memory device, reading is often carried out in block units (where a block is an assembly of sectors of consecutive addresses). In this case, data is read in order from the sector of the first address in the block. For example, let us consider a case where the computer reads eight sectors at the addresses of sector S4 to sector S11 in order.

Specifically explaining, the host computer 32 first selects the sector S4 closest to the home position HP in the block and gives a read instruction of sector S4. The drive 31 moves the optical head 50 to the track TR1. Since the memory in the MPU 33 preliminarily stores the track numbers TN and sector numbers therein in a table form, presence or absence of sector S4 can be determined by reading the track number TN1 of this track TR1. Judging that the movement was successful, the data of track TR1 is stored in the memory in the MPU. Then, the MPU transfers the data of sector S4 to the host computer 32. Next, since the data is present in the memory to read instructions for sector S5 to sector S7, the data is transferred to the host computer 32 without performing movement of the optical head.

Next, the host computer 32 gives a read instruction of sector S8 and the MPU 33 tries moving the optical head 50 to the track TR2 in which the sector S8 is present. However, supposing the movement to the target track was unsuccessful and the optical head moved, for example, to the track TR0, the data of sectors S0 to S3 in the track TR0 is not stored in the memory. Namely, if the optical head moved to a track not having the sector instructed, the data of the sectors in the erroneous track is not stored in the memory.

A third algorithm is next explained. This algorithm is such that whether data should be stored or not is determined from a relation between a remaining capacity of memory for storing data and the address of the track reached after unsuccessful movement. In detail, only if the address of the track reached after unsuccessful movement is greater than the address of the target track and only if a quantity of data from the target track to the track reached after unsuccessful movement is not more than the remaining capacity of the memory, the data of the track reached is stored in the memory.

The third algorithm is explained in more detail. Let us suppose here that the memory for storing data has a capacity for storing data of five tracks.

First, the algorithm is explained assuming that the memory already stores data of two tracks. It is assumed that when the host computer 32 issued a read instruction of sector S0, movement to the target track was unsuccessful and the optical head moved to the track TR3. At this time, the remaining capacity of the memory is of three tracks. However, the data quantity from track TR0 including the sector S0 to the track TR3 is of four tracks. The data of track TR3 is not stored in the memory accordingly.

The effect of this algorithm is next described. If the optical head were moved three times toward the track TR0 and all the data of the respective tracks TR1, TR2, TR3 were stored in the memory, the memory would be filled with the data of the tracks reached after unsuccessful movement. Even if the optical head were next successfully moved to the target track TR2, Some data must be abandoned according to a predetermined abandonment algorithm because of no vacancy in the memory. Use of the third algorithm can obviate this abandoning processing.

As explained above, first, if there is a limit to the capacity of the memory, data is stored in the memory taking account whether data of sectors in the track reached or data of the track can be stored or not. When the optical head reaches the target track, the data thereof is, of course, stored in the memory. Even if the movement were unsuccessful, the computer would give a next instruction to request data of the unsuccessful track with high probability, and then the data requested by the host computer would be able to be quickly transferred thereto in that case.

As explained above, the first embodiment effectively utilizes the track scanning in the case of unsuccessful movement to the target track, whereby the reproducing speed can be maintained at the same level even with unsuccessful movement to the target track as those of the conventional apparatus.

If the memory of the reproducing apparatus is not sufficient as shown in the second embodiment and if the movement to the target track was unsuccessful, simplification of processing becomes possible by employing an appropriate algorithm to determine whether the data of the track should be stored or not in the memory.

It is noted that the positions in the recording medium were recognized by the addresses given in track units in the first and second embodiments, but the effect of the present invention can be maintained when the positions in the recording medium are recognized by the addresses given in sector units.

Third Embodiment

The third embodiment of the present invention is next explained in detail with reference to the drawings. The apparatus used in the present embodiment is the same as shown in FIG. 3, and the description thereof is omitted herein.

Figure 7:
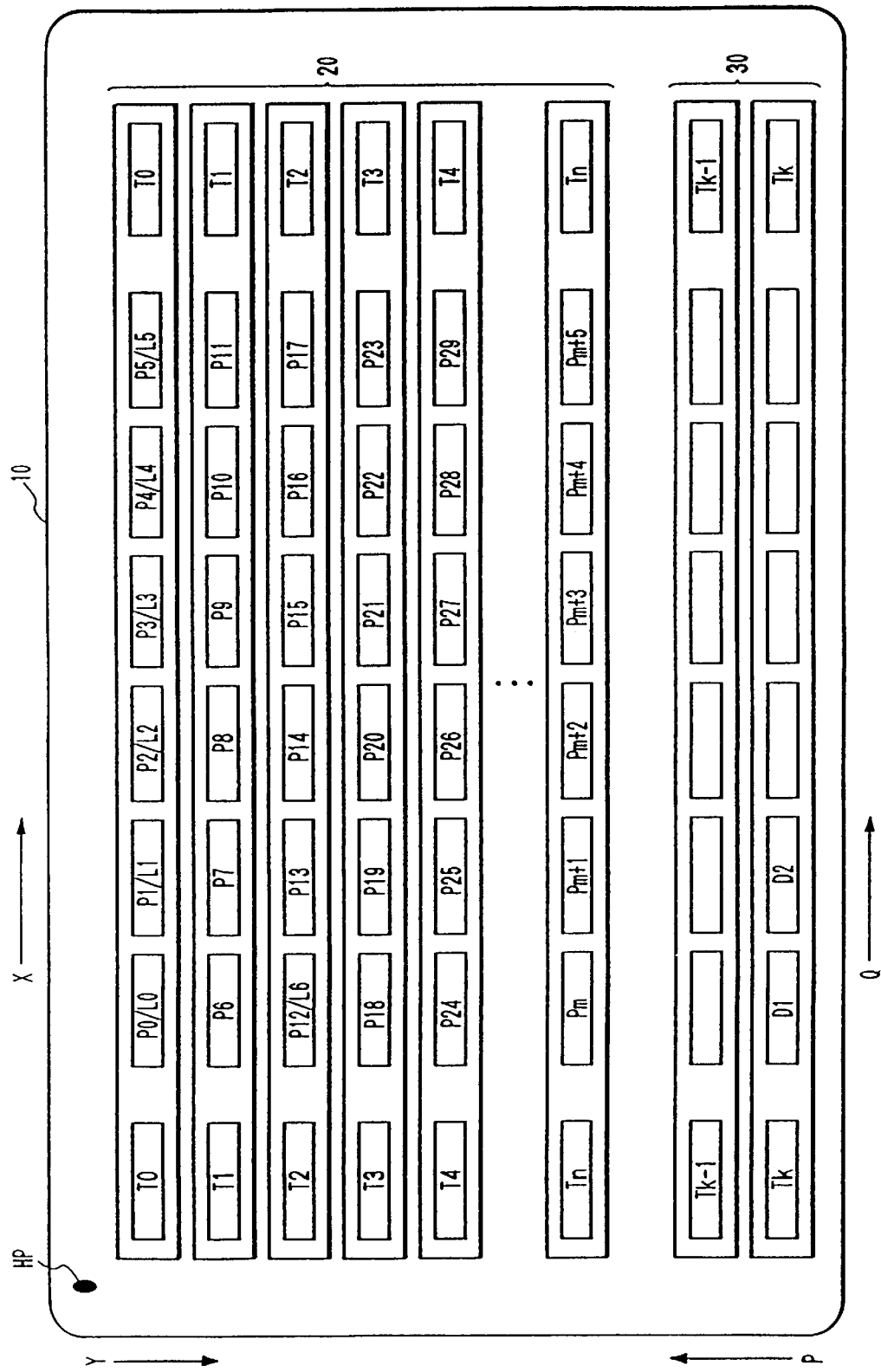
FIG. 7 is a schematic drawing of a recording surface of an optical card used in the information recording method of the present invention.
Figure 8:
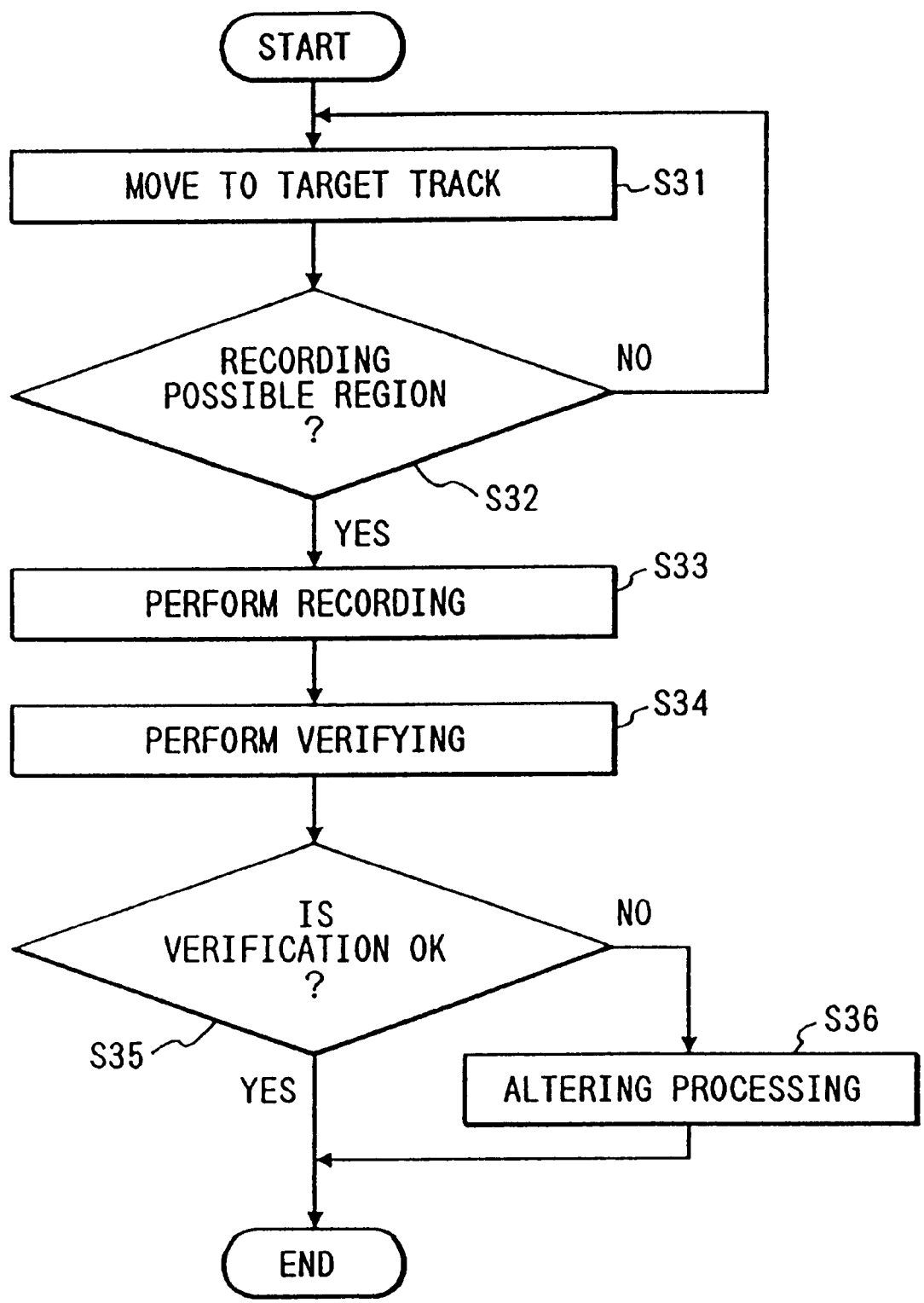
FIG. 8 is a flowchart to show a flow of processing in the information recording method of a third embodiment of the present invention.

FIG. 7 is a drawing to show a recording surface of the optical card used in the information recording method of the present embodiment, in which reference numeral 10 designates the optical card, T0 to Tn track numbers, P0, P1, . . . physical addresses of sectors, L0, L1, . . . logical addresses of sectors in which data is recorded, X, Y data recording directions, P, Q directory recording directions, and HP the home position of the optical head 50. The description to follow is based on the structural drawing of the optical card 10 in FIG. 7 and the flowchart of FIG. 8.

First, the host 32 gives a recording instruction of logical address L0 to the drive apparatus 31. Then, the MPU 33 moves the optical head 50 to a track including a sector in which no data is recorded (step S31). This state to move to the target track is described in further detail. When the optical card 10 is initially loaded in the apparatus, the optical head 50 is located at the home position HP and then the drive motor 36 moves the optical head in the Y-direction toward the target track. There are a variety of methods proposed for accurately moving the optical head to the target track on the optical card 10, but it cannot be determined in practice whether a track reached is the target track or not unless the track is scanned in the card scanning direction (in the X-direction or a direction opposite to the X-direction) to read the track number.

Then, the MPU 33 feeds the optical card 10 in the direction opposite to the X-direction by the card feed motor 37. As a result, the optical head 50 scans the track in the X-direction. When the track number is read, it is determined whether there is a recording-possible region (step S32). If there is no recording-possible region, movement to the target track is again carried out (step S31). If there is a recording-possible region, the track is scanned in the X-direction to record data therein (step S33). Further, the sector in which the data was recorded is again scanned in the X-direction to read the data for verification (step S34). In the present embodiment, the host computer 32 gave recording instructions of from L0 to L5 to the drive apparatus 31 and track movement, and recording was normally ended. However, when the host computer gave a recording instruction of L6, the movement of the optical head 50 of the drive apparatus 31 was unsuccessful. Namely, the optical head was originally intended to move to the target track T1, but actually moved to the track T2. Since the track T2 is a recording-possible region, recording of L6 is carried out in the physical sector P12. The physical sectors P6 to P12 are memorized as defect sectors in the RAM memory in the MPU 33 and the processing is completed.

Figures 10, 11:
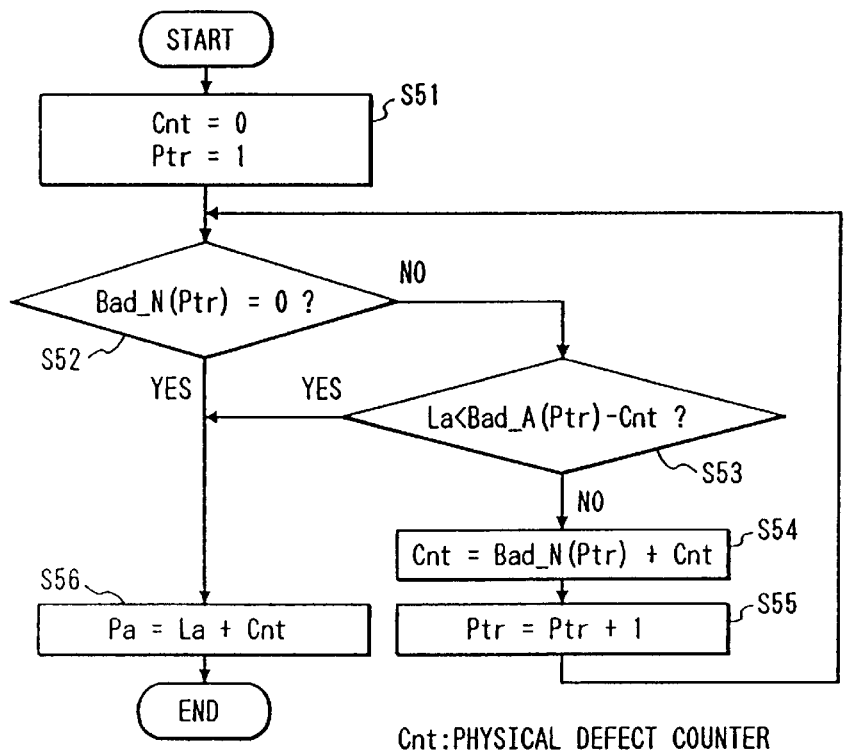
FIG. 10 is a flowchart to show a flow of processing for reproducing data recorded by the information recording method of the present invention.
FIG. 11 is a defect list table concerning data recorded in the third embodiment of the present invention.

Next explained is the case where the host computer 32 makes access to the data recorded as described above by designating the logical address to the drive apparatus 31. FIG. 11 shows a defect list stored in the RAM memory in the MPU 33, which includes a record of defect list numbers, defect start addresses, and numbers of consecutive defects. FIG. 10 is a flowchart to show procedures for reading data as converting a logical address into a physical address, using the defect list. FIG. 10 is explained with an example of reproduction of data at the logical address 6 in FIG. 7.

Step S51 is arranged to initialize defect counter Cnt for counting defect sectors to 0 and defect list number Ptr to 1. Step S52 checks whether the number of consecutive defects in the defect list number Ptr is 0 or not, and if it is 0, then the processing proceeds to step S56 as determining that there is no defect in the list. If the number is not 0, then step S53 is executed as judging that there is a defect list. At step S53, the defect counter Cnt (=0) is subtracted from the defect start address (=6) in the defect list, and the result is compared with the logical sector address La6 given. Here, because the logical sector address La6 given is not smaller than the right side (the resultant of subtraction of Cnt from the defect start address in the defect list number 1), the processing goes to step S54. At step S54, the number of consecutive defects N (Ptr) (=6) in the defect list number 1 is added to the defect counter Cnt. At step S55 the defect list number Ptr is given an increment (Ptr+1).

Further, step S52 is executed. Since the defect list number 2 includes 0 in the number of consecutive defects, step S56 is carried out.

The physical address is calculated at step S56. Since Cnt=6 and the logical address given La =6, the physical address Pa obtained is 12; that is, sector P12.

In this manner the information corresponding to the sector L6 of the logical address is recorded in the sector P12 of the physical address Pa. If over tracking is made by a track and if the track reached after jumping is a track in which no data is recorded, the information instructed is recorded in the track and jumped tracks are dealt with as defect tracks; more precisely, sectors in the track are dealt with as defect sectors, thus resulting in presenting a great effect of decreasing the recording period. Since some thousand tracks are expected as information recording tracks in one optical card, the time reduction during operation is more advantageous even with allowing to jump one track or several tracks.

Fourth Embodiment

Figure 9:
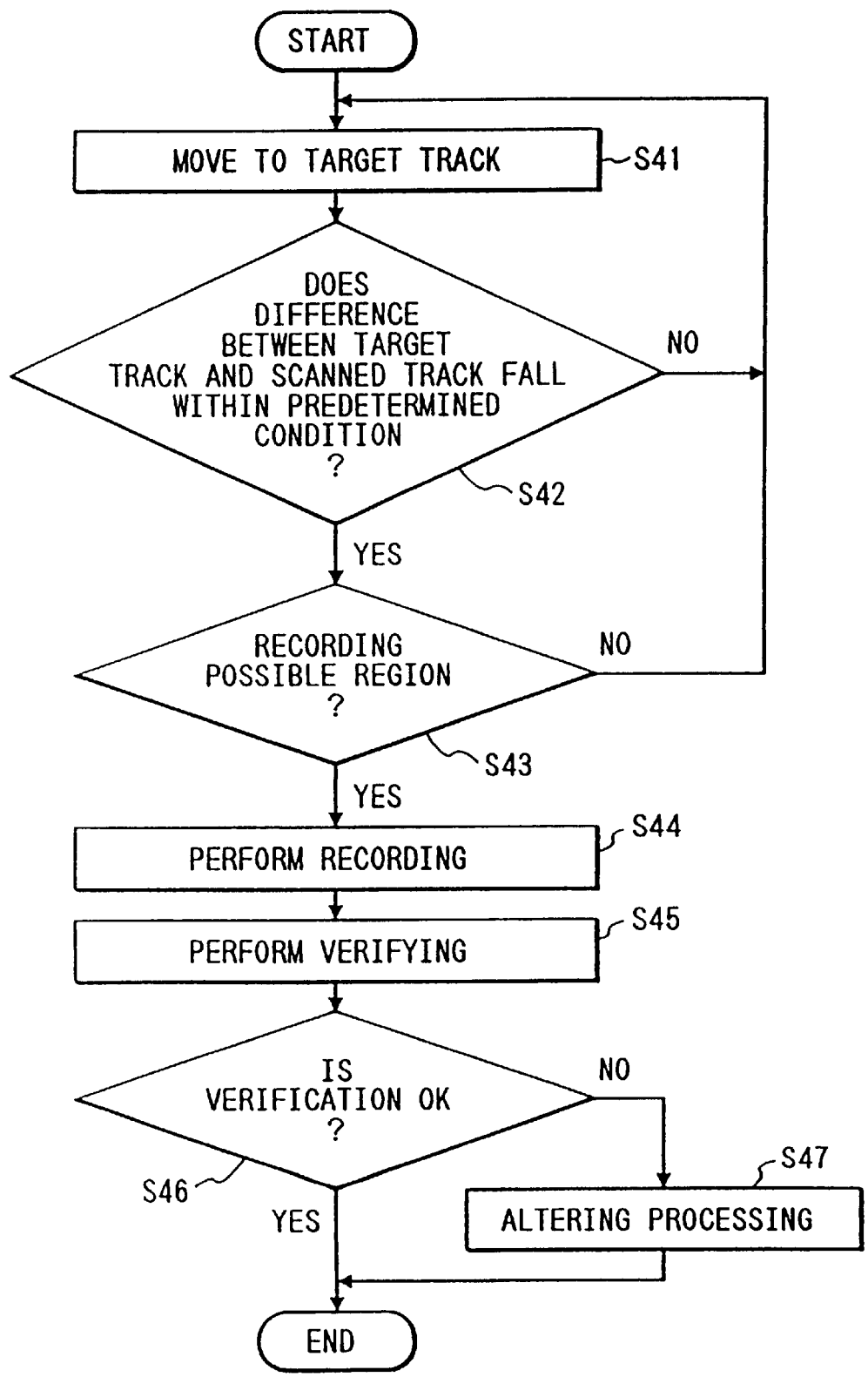
FIG. 9 is a flowchart to show a flow of processing in the information recording method of a fourth embodiment of the present invention.

The third embodiment showed an example in which the Y-directional movement of the optical head 50 missed only one track, whereas the present embodiment is an example in which the optical head misses some ten or even some hundred tracks because of runaway or the like of the drive motor 36, which is explained using the flowchart of FIG. 9. After the drive apparatus 31 receives a recording instruction of data from the host computer 32, movement of the optical head 50 is started to the target track (step S41). Scanning the track number, it is determined whether a difference between the target track and the scanned track falls within a predetermined condition (step S42). The determination standard changes system by system depending upon the total number of tracks in the optical card, the altering processing method, or the like. In the present embodiment, the difference is determined as to be large for ten or more tracks, but as to be small for 9 or fewer tracks. If the difference between the target track and the track reached after jump is ten or more, the optical head 50 is again moved to the target track. If the difference is less than 10, the processing proceeds to step S43. Step S43 is to determine whether a recording-possible region exists in the track scanned, and if no recording-possible region exists, then the processing goes to step S41. If a recording-possible region exists, then the processing proceeds to step S44 to record data sent from the host 32 in the recording-possible region. Step S45 is to perform the verification operation for checking whether the data recorded is normally recorded or not. If there is an anomaly in the verification, the altering processing is carried out at step S47. If the verification is normal, the recording operation of the recording instruction from the host 3 is ended.

Since the method for reading the data recorded in the present embodiment is the same as in the first embodiment, the description thereof is omitted herein.

The above embodiment is so arranged that the MPU 33 sets a track with a region of no record as the target track by arithmetic to find it from the number of record-including logical sectors having been stored in the RAM before the current recording instruction, and if the optical head 50 moves from the home position HP to the target track as counting zero-cross points in the tracking error signal, it rarely passes some ten tracks as described above. In that case, the above event is peculiar. In the case of such an event, the operation according to the flowchart shown in FIG. 9 is extremely effective.

The information recording medium was explained with the example of the optical card in the above embodiments, but the information recording medium may be any one of those shaped as a disk, card, tape, or the like. Further, the recording method is not limited to the optical method, but may be another method, such as the magneto-optical method or the magnetic method. For example, in the case of the disk medium, because the disk is rotating, the optical head reaches the target track by counting the tracks. If the track reached is not the target track, but if there is a recordless region, the recording operation is immediately started to record data therein. This can achieve the recording operation within a short time.

As explained above, even if movement of the optical head to the target track was unsuccessful, but if recording is possible in the track, the data is recorded therein, whereby the recording time can be decreased.

If the difference is large between the address of the target track and the track address of the track to which the optical head actually moved, movement to the target track is again tried without performing recording of data, which provides a system with a decreased number of redundant tracks (defect sectors) and decreases the recording time.

What is claimed is:

1. An information recording apparatus for recording information in a recording medium having a plurality of tracks with respective addresses, comprising:
   a recording head;
   a moving mechanism for relatively moving said recording head relative to the recording medium in order to let said recording head access a target track of the plurality of tracks; and
   controlling means arranged such that when said recording head fails to access the target track, and instead reaches another track of the plurality of tracks, said controlling means writes information in the other track reached.

2. The information recording apparatus according to claim 1, wherein said controlling means checks whether the other track reached is a writable track or not, before writing the information in the other track reached.

3. The information recording apparatus according to claim 1, wherein said controlling means is arranged such that when a difference between an address of the other track reached and an address of the target track is not less than a predetermined difference, said controlling means does not write the information in the other track reached, but again carries out access to the target track.

4. An information recording method for recording information, using a recording head, in a recording medium having a plurality of tracks with respective addresses, comprising the steps of:

moving the recording head relative to the recording medium to let the recording head access a target track of the plurality of tracks; and writing information in another track of the plurality of tracks reached when the recording head fails to access the target track.

* * * * *

UNITED STATES PATENT AND TRADEMARK OFFICE
CERTIFICATE OF CORRECTION

| | |
|---|---|
| PATENT NO. | : 6,014,350 |
| APPLICATION NO. | : 09/172871 |
| DATED | : January 11, 2000 |
| INVENTOR(S) | : Masahiro Tamegai |

It is certified that error appears in the above-identified patent and that said Letters Patent is hereby corrected as shown below:

ON THE COVER PAGE
      At [54], "INFORMATION REPRODUCING OR RECORDING APPARATUS PROVIDED WITH MEMORY FOR STORING DATA, AND INFORMATION REPRODUCING OR RECORDING METHOD USING THE SAME APPARATUS"

should read

--INFORMATION RECORDING APPARATUS AND METHOD USING ACCESSING CONTROL FOR RECORDING INFORMATION ON A RECORDING MEDIUM--.

At [56] References Cited

U.S. PATENT DOCUMENTS, the "References Cited" should also list the following U.S. Patents:

| | | | |
|---|---|---|---|
| --5,247,499 | 9/1993 | Hayashi, et al. | 369/32 |
| 5,402,399 | 3/1995 | Oshiba, et al. | 369/32 |
| 5,442,614 | 8/1995 | Tamegai | 369/58 |
| 5,444,679 | 8/1995 | Ko | 369/32 |
| 5,532,991 | 7/1996 | Sasaki | 369/44.350-- |

Column 1

In the Title

"INFORMATION REPRODUCING OR RECORDING APPARATUS PROVIDED WITH MEMORY FOR STORING DATA, AND INFORMATION REPRODUCING OR RECORDING METHOD USING THE SAME APPARATUS"

should read

-- INFORMATION RECORDING APPARATUS AND METHOD USING ACCESSING CONTROL FOR RECORDING INFORMATION ON A RECORDING MEDIUM--; and Line 21, "recording-media" should read --recording media--.

UNITED STATES PATENT AND TRADEMARK OFFICE
CERTIFICATE OF CORRECTION

| | |
|---|---|
| PATENT NO. | : 6,014,350 |
| APPLICATION NO. | : 09/172871 |
| DATED | : January 11, 2000 |
| INVENTOR(S) | : Masahiro Tamegai |

It is certified that error appears in the above-identified patent and that said Letters Patent is hereby corrected as shown below:

<u>Column 3</u>

Line 36, "used-in" should read --used in--.

<u>Column 5</u>

Line 51, "S11." should read --S11--.

<u>Column 7</u>

Line 56, "TR2.  Some" should read --TR2, some--.

Signed and Sealed this

Twenty-fourth Day of July, 2007

JON W. DUDAS
*Director of the United States Patent and Trademark Office*